R. T. ELWELL.
RUBBER HEEL.
APPLICATION FILED AUG. 29, 1907.
909,567.
Patented Jan. 12, 1909.
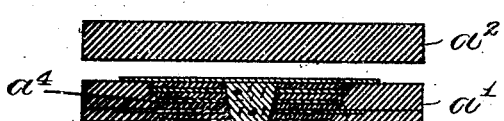
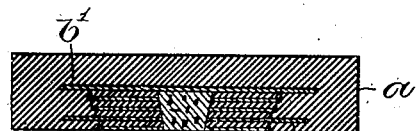
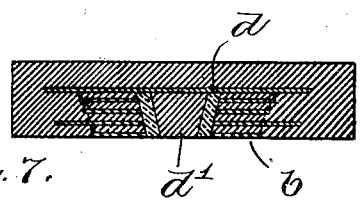
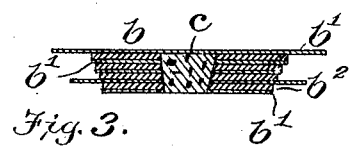
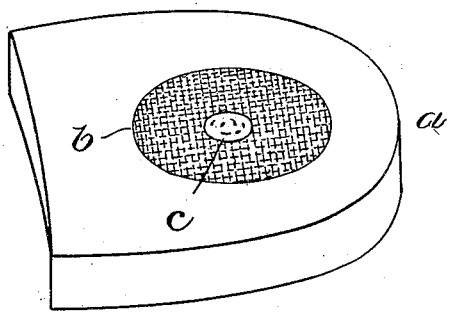
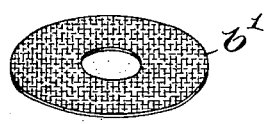
Witnesses.
A. L. Folsom
H. L. Robbins
Inventor.
Russell T. Elwell
by
Attys.

UNITED STATES PATENT OFFICE.

RUSSELL T. ELWELL, OF PATERSON, NEW JERSEY.

RUBBER HEEL.

No. 909,567.   Specification of Letters Patent.   Patented Jan. 12, 1909.

Application filed August 29, 1907.  Serial No. 390,619.

*To all whom it may concern:*

Be it known that I, RUSSELL T. ELWELL, of Paterson, in the county of Passaic and State of New Jersey, have invented certain new and useful Improvements in Rubber Heels, of which the following is a specification.

This invention has relation to foot wear, and more particularly to rubber soles or heels for boots or shoes.

The object of the invention is to provide rubber soles or heels with wear and slip preventing means without detracting from the cushioning effect thereof. This is accomplished by providing soles or heels with one or more plugs, which are formed of alternating flat layers of fabric and rubber or layers of rubber-coated fabric, which are arranged parallel to the face of the heel or sole. Preferably the plug is frusto-conical with the smaller end flush with the face of the heel, this shape being secured by increasing the diameters of the successive layers. As a further refinement of the invention, the plug is provided with a core or center of some suitable slip-resisting material, such as cork, soft lead, or the like, the fabric layers of the plug encircling said core and serving to securely bind it in place and hold it against lateral movement. The core may be solid, or hollow to receive a filling of rubber, and is preferably frusto-conical or outwardly tapering.

In forming the heel or the sole, two or more layers of green rubber of the proper shape are prepared, one of them having an aperture therein. In this aperture the plug, which preferably consists of layers or fabric and green rubber or layers of rubber-coated fabric, is located. The parts are assembled in a mold and are vulcanized under pressure to produce a finished sole or heel.

On the accompanying drawings,—Figure 1 represents in section a heel embodying the invention. Fig. 2 represents the two layers of rubber separated, one of the layers containing the plug. Fig. 3 represents one of the plugs in section. Fig. 4 represents in perspective view the finished heel. Figs. 5 and 6 represent, respectively, a layer of fabric and a layer of rubber, which form part of the plug. Fig. 7 illustrates in section another form of heel embodying the invention.

Although the drawings illustrate a heel, it will be understood that the invention may, with equal facility, be embodied in a sole, and hence in using the term "heel" in the following specification and claims, I mean to include as an equivalent a sole as well.

With reference to the drawings, $a$ indicates a body of rubber in the shape of a heel. This is initially formed in two or more layers as at $a'$ $a^2$ $a^3$ of green rubber, the layers $a'$ and $a^3$ having apertures $a^4$.

$b$ indicates a plug, which consists of a series of alternating layers $b'$ $b^2$ of duck, canvas, or other fabric, and rubber. In lieu of separate layers of fabric and rubber, I may employ layers of fabric faced with rubber (or rubber compound) which I consider to be an equivalent thereof. The layers increase in diameter from the outer to the inner end of the plug, so that the latter is substantially beveled or tapering at its side edges. This plug is inserted in the apertures $a^4$, and the assembled parts are then subjected to vulcanization under pressure.

$c$ indicates a tapering core of suitable slip-preventing or wear-resisting material, such as cork, lead or the like, which is inserted in an aperture in the center of the plug prior to the vulcanizing process. More than one core may be employed if desired. In lieu of a solid core, I may employ one which is hollow as shown at $d$ in Fig. 7, and fill it with rubber as at $d'$. In this case, the core is preferably made of soft lead or other equivalent material. The layers of fabric serve to securely bind the core in the heel, and prevent it from working loose or being separated from the body of the heel, since the fabric is unyielding laterally.

A heel formed as herein described has numerous features of advantage. The layer $a^2$ or the upper portion of the heel serves as a cushion for the plug, while the plug itself resists wear and prevents slipping of the heel on wet or damp surfaces. The shape of the plug prevents it from being loosened, and causes a greater wearing surface to be exposed as the surface of the heel is worn.

It is to be understood of course, that by the word "plug" it is intended to mean that the material forming said plug is surrounded by the material which forms the body $a$. If the layers of fabric and the rubber alternate therewith extended to the edge or margin of the article, they would not then constitute a plug.

Having thus explained the nature of my said invention, and described a way of constructing and using the same, although without attempting to set forth all of the forms in which it may be made or all of the modes of its use, what I claim is:

1. A heel comprising a rubber body having a lead insert, and one or more layers of fabric vulcanized in the heel for holding said insert in the body, said layers being substantially parallel with the tread surface of the heel.

2. A heel comprising a rubber body and a plug, said plug having alternating flat layers of fabric and rubber which vary in diameter and are parallel to the face of the heel, integral portions of the rubber body being interlocked with said layers of fabric.

3. A heel comprising a rubber body and a plug, said plug having alternating flat layers of fabric and rubber, which increase in diameter successively, and are parallel to the face of the heel, integral portions of the rubber body being interlocked with said layers of fabric.

4. In a rubber heel, a body and a plug, said plug comprising a core of slip-preventing material, and flat layers of fabric parallel to the face of the heel and encircling the core.

5. In a rubber heel, a body and a plug, said plug comprising a core of slip-preventing material, and flat layers of fabric apertured to receive and encircle said core.

6. In a rubber heel, a body and a plug, said plug comprising a core of slip-preventing material which tapers towards its outer end, and flat alternating layers of rubber and fabric apertured to receive said core.

7. In a rubber heel, a body, and a plug, said plug comprising a hollow core of lead, a filling of suitable material in said core, and encircling layers of fabric, said layers being substantially parallel with the tread surface of the heel.

In testimony whereof I have affixed my signature, in presence of two witnesses.

RUSSELL T. ELWELL.

Witnesses:
MARCUS B. MAY,
ARTHUR H. BROWN.